US005213232A

United States Patent [19]
Kraft et al.

[11] Patent Number: 5,213,232
[45] Date of Patent: May 25, 1993

[54] ROTATING APPARATUS FOR DISPENSING SINGLE HOMOGENEOUS UNITS

[75] Inventors: Thomas L. Kraft; James W. Meador; John F. Berry; Lisa W. Rogers, all of Houston, Tex.

[73] Assignee: Owen Healthcare, Inc., Houston, Tex.

[21] Appl. No.: 849,513

[22] Filed: Mar. 11, 1992

[51] Int. Cl.[5] .............................................. B65G 59/00
[52] U.S. Cl. .................................... 221/277; 198/657
[58] Field of Search ................. 221/277, 261, 75, 188, 221/203; 198/670, 661, 659, 657

[56] References Cited

U.S. PATENT DOCUMENTS

| | | | |
|---|---|---|---|
| 2,665,796 | 1/1954 | Anderson | 198/215 |
| 3,715,055 | 2/1973 | Kendrick et al. | 221/75 |
| 4,258,860 | 3/1981 | Boettcher | 221/75 |

FOREIGN PATENT DOCUMENTS

| | | | |
|---|---|---|---|
| 322269 | 6/1989 | European Pat. Off. | 221/277 |
| 962137 | 9/1982 | U.S.S.R. | 221/75 |

*Primary Examiner*—Robert P. Olszewski
*Assistant Examiner*—Kenneth Noland
*Attorney, Agent, or Firm*—Parks & Associates

[57] ABSTRACT

An apparatus for dispensing single homogeneous units upon rotation of the apparatus comprising a generally circular walled container having a bottom for holding the singular homogeneous units. A discharge area located distally from the bottom for receiving the single homogeneous units and for discharging them upon rotation of the apparatus. A helical spiraled rib member located on the generally circular walled container extending from the bottom of the container and along the circular walls of the container for creating during rotation a continuously variable inclined surface along the helical spiraled rib member and the circular walls of the container for advancing single homogeneous units along said helical spiralled rib member and the generally circular walls of the container until a single homogeneous unit reaches the discharge area for discharge from the container. The helical spiraled rib member has a helix depth from the circular wall of the container sufficient for advancing only a single homogeneous unit along the helical spiraled rib member and the generally circular wall of the container until a single homogeneous unit reaches the discharge area. The helical spiralled rib member has a helix angle sufficient relative to the length of the generally circular walled container from the bottom to the discharge area for creating during rotation a sufficient inclined surface for advancing single homogeneous units to the discharge area. Further, this invention provides removable caps which are used to seal these containers from the ambient environment when not being used for dispensing of single homogeneous units.

30 Claims, 4 Drawing Sheets

ROTATING APPARATUS FOR DISPENSING SINGLE HOMOGENEOUS UNITS

SUMMARY OF THE INVENTION

This invention comprises an apparatus for dispensing homogeneous units one at a time upon rotation of the dispensing apparatus. The apparatus of this invention is designed for dispensing single homogeneous units such as pills, one at a time, substantially each and every time that one complete rotation of the circular walled container occurs or provides for an adjustment to achieve such dispensing regularity. Further, this apparatus may be used for dispensing single homogeneous units by hand held containers being rotated by a human hand for the dispensing of one pill or unitized homogeneous unit at a time and not having all the pills fall out during the dispensing operation.

Further, this apparatus comprises means for automatic separating of the single homogeneous units and then dispensing of single homogeneous units one at a time as the rotation of the apparatus of this invention occurs.

The apparatus of this invention separates and prevents the distribution of two or more pills at a time and is designed to deliver one pill at a time at the point of discharge. The apparatus further provides for adjustments to the tilt angle to provide for distribution of the homogeneous units for when various degrees of fullness within the container occurs so that excessive multiple rotations are not required to dispense the single homogeneous units, i.e.—medications.

BACKGROUND OF THE INVENTION

This invention relates to an apparatus for dispensing single homogeneous units upon rotation and relates more particularly to uses for dispensing single homogeneous unitized medicines, by way of example pills and capsules, either in drug stores, pharmacies or for use by individuals. This invention relates to an apparatus for dispensing a single pill or capsule one at a time from a container in one embodiment.

The prior art such as Soviet patent 1,060,404 issued to Voron Poly has used a closed auger system for attempting to channelize the medications into a multiple staged augered channel, but this is not useful because it induces grinding of the surfaces of the single homogeneous units. The problem with damage to unitized medications and other unitized materials for being dispensed is that they are made defective by the time they are finally dispensed. Further, in the chamber the units rub against each other during multiple rotations and they create abrasion or wearing of the surfaces just from multiple rotations within the auger system itself. Further, the internal auger's screw thread, blades or spirals all cause extensive damage to medication and pills or other sensitive single homogeneous unitized materials. Also, as these augers were very slow and expensive, they caused significant assembly problems in the production and filling of the containers.

The U.S. Pat. No. issued to Anderson 2,665,796 is the auger type patent also and while it is fine for conveying products which are to be consumed like burned coal, the auger has a tendency to grind, grate and do significant damage to single homogeneous units and in the case of medication has a tendency to reduce the dosage level and efficacy by scraping and eroding the surface of the pills thereby reducing the unit medication dosage to be dispensed or where it would be intended to be absorbed into the body. Also by taking a coating off the unitized medications it may change whether the medication can be taken orally, etc. Also, such patents as U.S. Pat. No. 4,222,502 issued to Gubitose, et al, for metering and dispensing abrasive materials was not concerned with the problem associated with abrasiveness and multiple rotations of the product on itself. Clearly this patent would not lend itself to the separation of unitized homogeneous units on a one at a time basis, but is simply another form of an auger.

Further attempts at dispensing unitized homogeneous units from such apparatus as "gun belt" cartridges, clips, and special carrying trays and cups all have had problems with contamination from one item to the next to be dispensed and they were slow speed and had a high cost of production. They further suffered from loading difficulties, packaging complexities and space inefficiencies in this type production equipment. The cartridge type approach was used in U.S. Pat. No. 4,018,358 issued to Johnson, et al, but it was extremely labor insensitive for the pharmacist to put pills into separate cartridges and then manually arrange these on a shelf for the dispensing of the pills. This type machine was of a prior art pill counting machine in reality. The problem with this prior art is that by the time pharmacist took the time to load cartridges he could have filled the prescription. Save and except for the automatic counting, they achieved little or no advantage from manual dispensing.

Further prior art such as Haigler, U.S. Pat. No. 3,677,437, has attempted to use separating devices such as vibrating devices for separating and feeding spaced and counted pills to a chute for their dispensing. Clearly the problem associated where vibration is utilized is the bridging effect of the unitized homogeneous units being dispensed. This bridging effect sets up a "Roman Arch" and jams the dispensing of the items. Also, in the case of medications it creates the problem of the pills being vibrated against themselves and the sides of container which produces medication damage. Also, devices such as vibrating equipment are very inefficient with space and have been known to create dust and are very slow and are not amenable to small containers for use in hospitals or other locations for dispensing one at a time single homogeneous units.

Further, there have been dispensing machines which were specialized for only one shape of single homogeneous units such as a pills which are substantially in the shape of a disk. Such art as U.S. Pat. No. 3,682,352 issued to Roast is a good example of a specialized device in the prior art aimed at a single type and shape of medication or single homogeneous units and cannot be applied across the spectrum of homogeneous units to be dispensed such as capsules or other different shapes of pills.

Further, other prior art such as U.S. Pat. No. 792,918 issued to Olendorf is associated with a pill counting machine which provides a specialized notch or container for receiving a standard size pill. However, the drawback to this invention is that it did not provide for dispensing numerous shapes or kinds of tablets but only a single disk type, without a complete change of the member for receiving the pill. Also, this device was aimed primarily at counting medications.

OBJECTS AND ADVANTAGES OF THE INVENTION

It is the object of this invention to provide an apparatus for dispensing single homogeneous units one at a time from a generally circular walled container containing the homogeneous units upon rotation of the generally circular walled container.

It is a further object of this invention to dispense these single homogeneous units one at a time without multiple or excessive numbers of rotations of the circular walled container.

It is a further object of this invention to dispense these single homogeneous units with as few rotations of the circular walled container as possible to prevent damage to the homogeneous units from abrasion and grinding by the single homogeneous units tumbling over each other and over the walls of the circular walled container or the helical member.

It is yet another object of this invention to pick up these homogeneous units and advance these single homogeneous units along the helical member and along the circular walls of the circular walled container until a single homogeneous unit reaches a discharge area for discharge.

It is the further object of this invention to provide an apparatus for dispensing single homogeneous units which have unusual dimensions, such as capsules, round pills, disk shaped tables, etc. albeit that they are in the smallest diameter or dimension roughly similar, using the same apparatus without having to use a different helix for each different shape or any other differing part or size specific part.

It is yet another object of this invention to provide a apparatus for dispensing these single homogeneous units without damage to the single homogeneous units from any auger blades or screw blades.

It also an object of this invention to provide an inexpensive and rapid distribution of these single homogeneous units and use a relatively small space to achieve their distribution.

It is also an object of this invention to provide the dispensing of single homogeneous units from either a hand held or mechanical device using the apparatus of this invention.

It is also an object of this invention to provide a light weight portable apparatus for use in dispensing the single homogeneous units by a hand held embodiment.

It is yet a further object of this invention to eliminate the need for a gun belt or cartridge type dispensing system for the dispensing of the single homogeneous units.

It is also a further object of this invention to eliminate the contamination problems which have been associated with the special carrying trays and cups for clip type dispenser when these prior art devices are used from one item to the next in reoccurring operations.

It is also an object of this invention to eliminate intensive labor for a pharmacist to load the separate cartridges and then manually arrange these on a shelf of an array for the dispensing of the pills from the machine of the prior art.

It is an object of this invention to provide the dispensing of single homogeneous units without the use of vibration and the problems associated with the bridging effect in these vibration dispensers.

It is an object of this invention to provide a dispenser which does not create dust from the single homogeneous units to be dispensed either because of vibration or any other side effect of the dispensing.

It is an object of this invention to provide an apparatus for dispensing single homogeneous units which is small and does not require large space for it to perform its work of dispensing single homogeneous units.

Also it is an object of this invention to provide an apparatus for dispensing single homogeneous units without requiring a specialized machine or special die or pattern for each and every different shape of single homogeneous units to be dispensed.

It is an object of this invention to provide an apparatus which does not require a specialized notch or groove which must be changed out for each and every type and shape of single homogeneous units to be dispensed.

BRIEF DESCRIPTION OF THE DRAWINGS

Referring to the drawings, which are for illustrative purposes only.

DESCRIPTION OF SOME PREFERRED EMBODIMENTS

Figure 1:
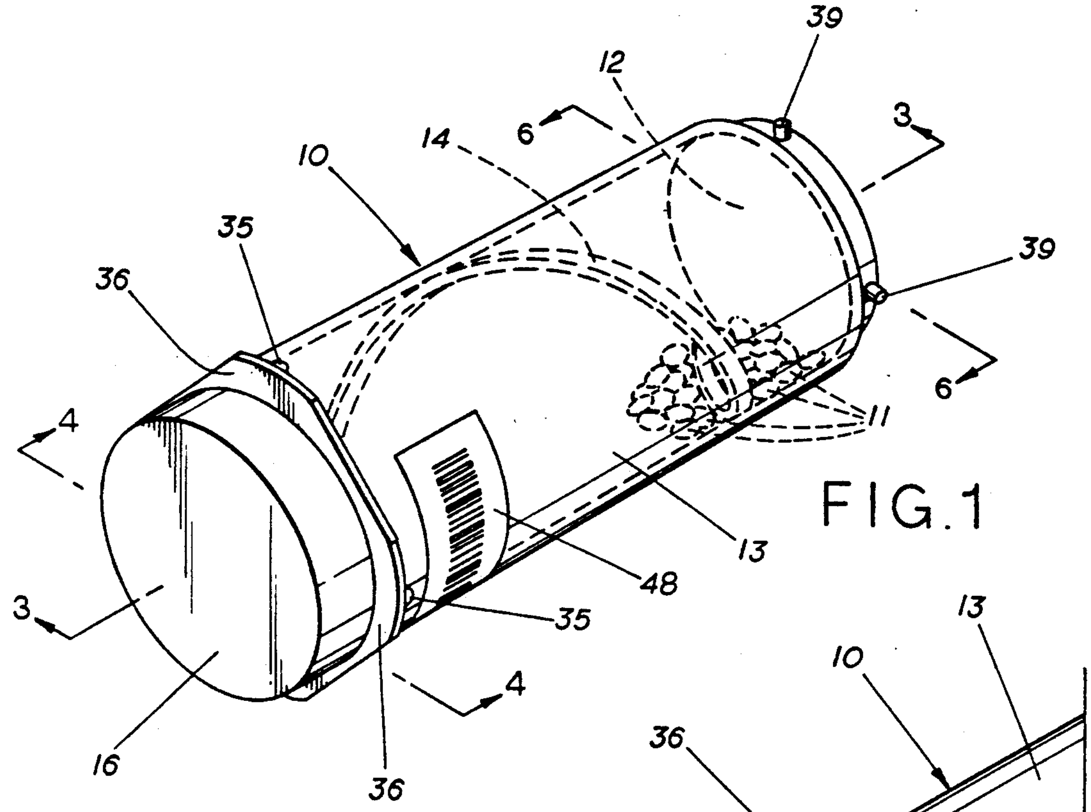
FIG. 1 is a perspective view of a opaque circular walled container with the top on the circular walled container.

Referring more particularity to the drawings there is shown generally at 10 in FIG. 1 an apparatus which shows an embodiment of this invention for dispensing single homogeneous units upon rotation of said apparatus 10. In this particular embodiment there is shown single homogeneous units 11, which in this embodiment are single homogeneous shaped pills or medications, located generally at the bottom 12 and along the generally circular walls 13 of the apparatus 10 of this invention. Also located along the generally circular walls 13 of the apparatus 10 is a helical member 14 which extends from the bottom 12 of the apparatus 10 and along the generally circular walls 13 for creating during rotation a continuously variable inclined surface along the helical member 14 and the generally circular walls 13 of the apparatus for advancing single homogeneous units 1 along the helical member 14 and the generally circular walls 13 from the bottom 12 to the top 15 of the apparatus 10. The view of the inside of the top 15 of the apparatus 10 of this invention is not seen in FIG. 1 as a cap 16 is in place on the apparatus 10 of this invention. However, by referring to FIG. 2 wherein the cap 16 is shown removed, it can be seen that the single homogeneous units 11 will continue their advancement along the continuously variable inclined surface along the single helical member 14 and the generally circular walls 13 of the apparatus 10, until a single homogeneous unit 11 reaches the discharge member, shown generally at 17, at which point the single homogeneous unit 11 enters the discharge member 17 for discharge therefrom.

Figure 2:
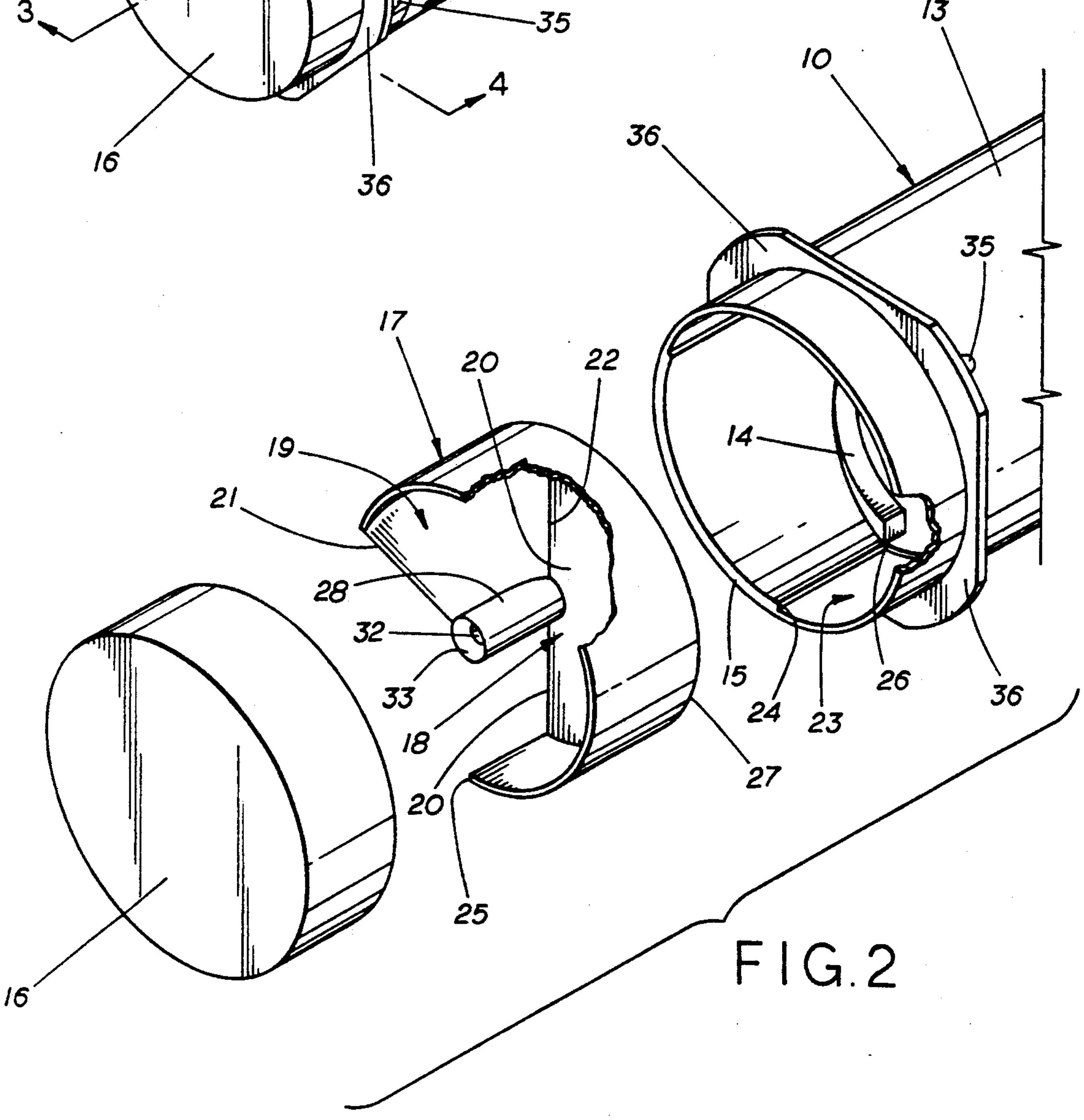
FIG. 2 is a relationship view of the opaque circular walled container, dispenser member, and top.

The discharge member 17 for discharge of single homogeneous units 11 can as shown in one embodiment in FIG. 2, be made into two stages with one stage to be a holding area 18 for receiving and holding the single homogeneous units 11 and the other stage a discharging element 19.

The holding area 18 for receiving and holding the single homogeneous units 1 is connected in sliding communication with the helical member 14 for sliding of the single homogeneous units 11 from the helical member 14 into the holding area 18 upon the rotation of the apparatus 10 of this invention. In at least one embodiment of the holding area 18 it is comprised of a non-helical surface 20 functionally connected to the helical member 14 and having substantially no helical angle. In some embodiments this non-helical surface 20 will be at right angles to the axis of the generally circular wall 13 and spread across a portion of the top 15, and along the generally circular wall 13. This non-helical surface 20 allows the holding of the single homogeneous unit 11 until visualizing or sensing of the single homogeneous unit 11 to be discharged can be completed either by the human eye or by sensing equipment for the verification of the desired number of single homogeneous units 11 located in the holding area 18 of the non-helical surface 20.

The discharging element 19 is connected in sliding communication with the non-helical surface 20 of the holding area 18 for sliding the single homogeneous unit 11 from the holding area 18 to the discharging element 19 upon the rotation of the apparatus 10 of this invention. The discharging element 19 is in one embodiment composed of a helical or inclined surface 21 which is spread across a portion of the top 15 and along the generally circular wall 13. The inclined surface 21 is also spread from its sliding connected point 22 with the non-helical surface 20 to the top 15 of the apparatus 10 for discharging the single homogeneous unit 11 upon the rotation of apparatus 10. In at least one embodiment a center post 28 is provided to secure the non-helical surface 20 and the inclined surface 21. The size of the nonhelical surface 20 in some embodiments must generally be at least as large as the single homogeneous unit 11 to be dispensed, but should not be so large as to completely cover the top 15 of the apparatus 10. Also in embodiments which use a discharging element 19 sufficient space must be left for the discharging element 19 and still not cover the top 15 of the apparatus 10. In some special embodiments a discharging element 17 may not be used, as those skilled in the art may appreciate. For example, in human hand held applications when human eye and hand coordination can adjust for the lack of having a discharging member 17, it may be deleted without departing from the scope of this invention. It will also be appreciated that the discharging member 17 serves yet another function in that by being positioned across the top of the apparatus 10, it prevents unwanted single homogeneous units 11 from inadvertent discharge.

It should be appreciated by those skilled in the art that the non-helical surface 20 and or the inclined surface 21 may be black or have special coating or colors on them to enhance the contrast between the single homogeneous units 11 and surfaces 20 and 21 for allowing for easy human visioning or automated sensing of the single homogeneous unit 11 while the single homogeneous unit 11 is on these surfaces 20 and 21 and before its discharge therefrom.

Figure 7:
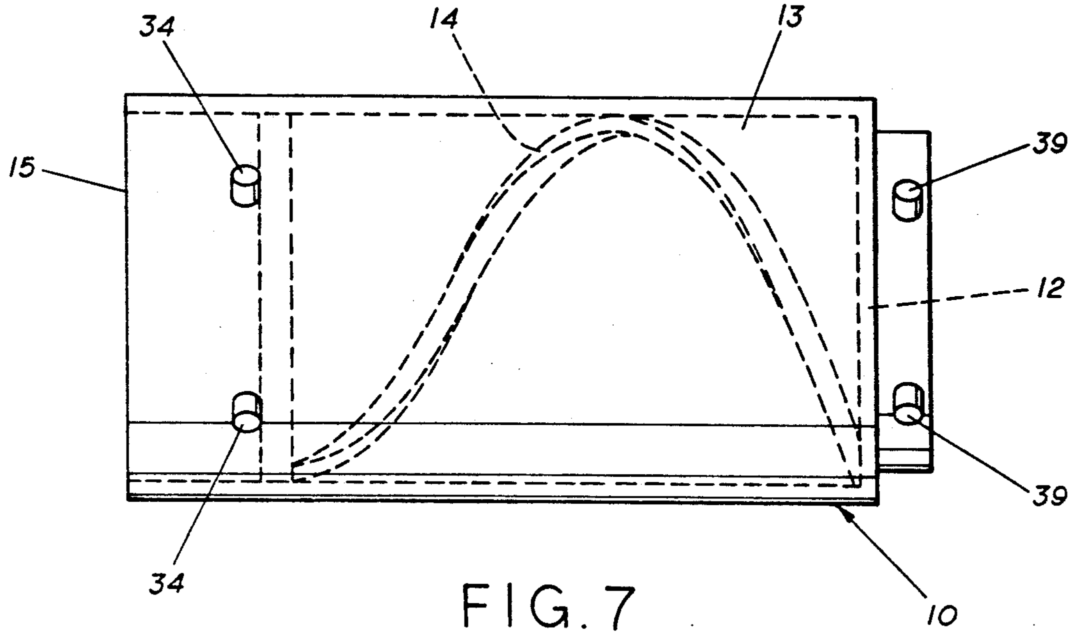
FIG. 7 is a side view of a clear plastic embodiment of the circular walled container of this invention.
Figure 8:
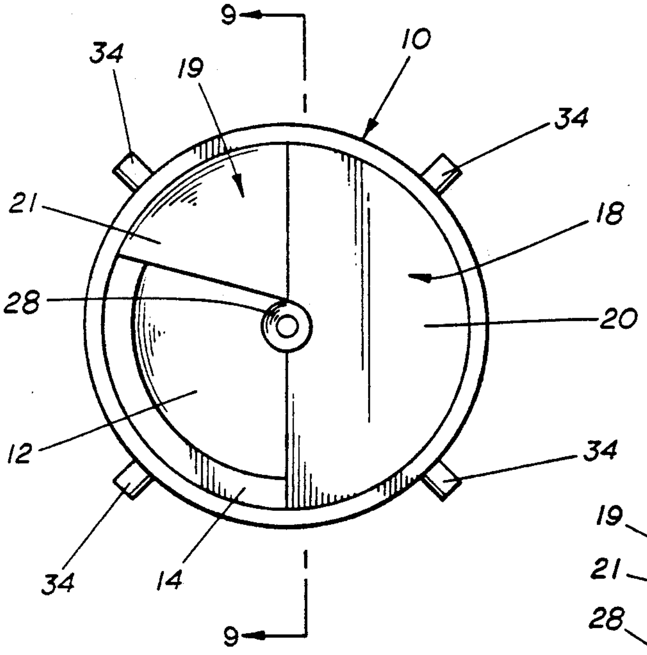
FIG. 8 is a top view of a clear plastic embodiment of the circular walled container of this invention with the discharge member fixedly mounted in the circular walled container of this embodiment.
Figure 9:
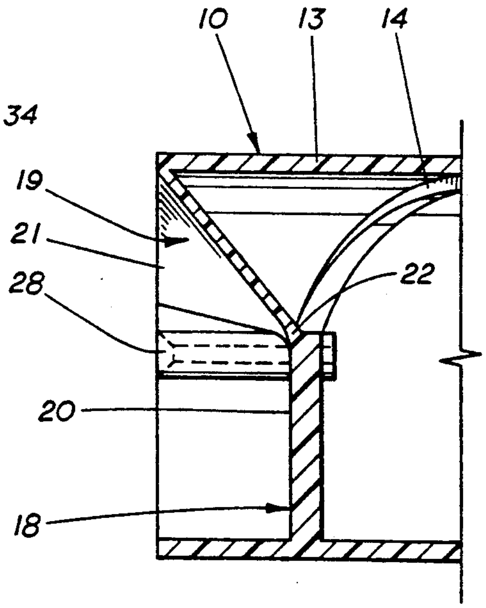
FIG. 9 is a sectional view taken through FIG. 8 showing the interface between the helical member and the discharge member.

It should also be appreciated by those skilled in the art that the discharge member 17 could be fabricated into the apparatus 10 of this invention as shown in FIG. 7,8, and 9 or made as a separate removable piece as shown in FIG. 2 with out departing from the scope of this invention.

In the embodiment as shown in FIG. 2, it can be seen that a special grooved key section 23 is recessed into the generally circular wall 13 of this embodiment of this invention for receiving the discharge member 17 and for properly locking it into proper functional location with the helical member 14. The special grooved key section 23 is composed of a recessed axial edge 24 which matches with the axial edge 25 of the discharge member 17 and a circular recessed edge 26 which matches with the circular edge 27 of the discharge member 17 for engagement of the discharge member 17 in the generally circular wall 13 of the apparatus 10.

It should be appreciated by those skilled in the art that the invention of this apparatus 10 could be hand held for rotation and the dispensing of the single homogeneous units 11 by hand. In the hand held use of this apparatus 10, it would allow an individual to dispense only one pill at a time and not have the experience of all the pills or a multitudinous number of single homogeneous units falling out all at once when only trying to get one or two pills out at the time. Also because the apparatus 10 is capable of being hand held it should be appreciated that the apparatus 10 of this invention is relatively light and easily portable.

It should also be appreciated by those skilled in the art that this invention of this apparatus 10 could be mechanically held for rotation and the dispensing of the single homogeneous units 11 by mechanical means instead of by hand.

Figure 3:
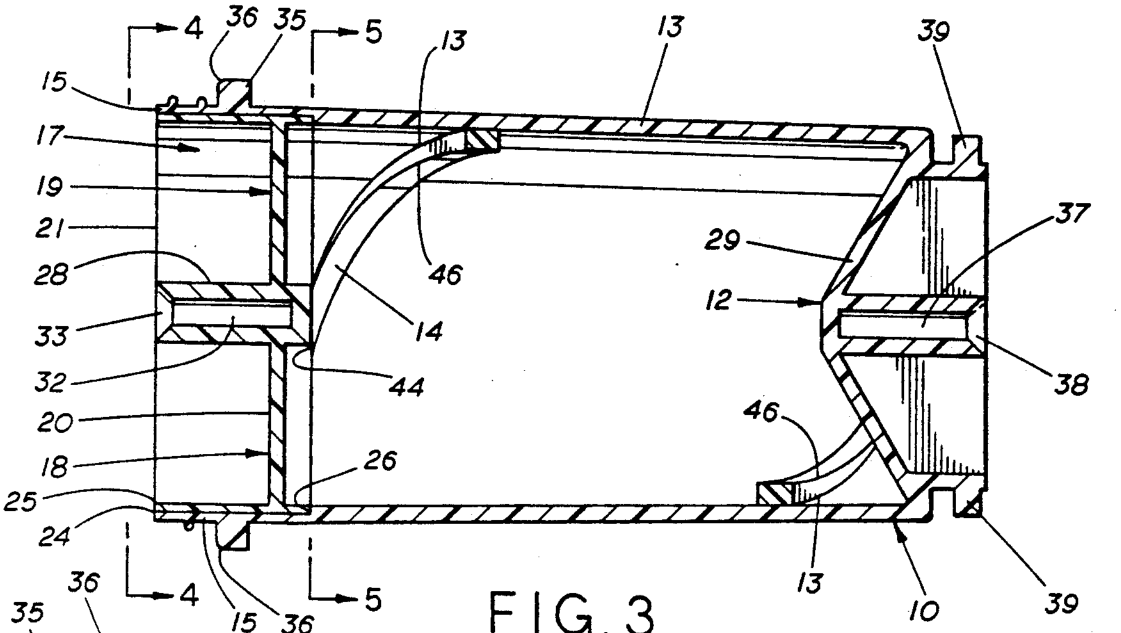
FIG. 3. is a side cross sectional view of the circular walled container of one embodiment of this invention.
Figure 4:
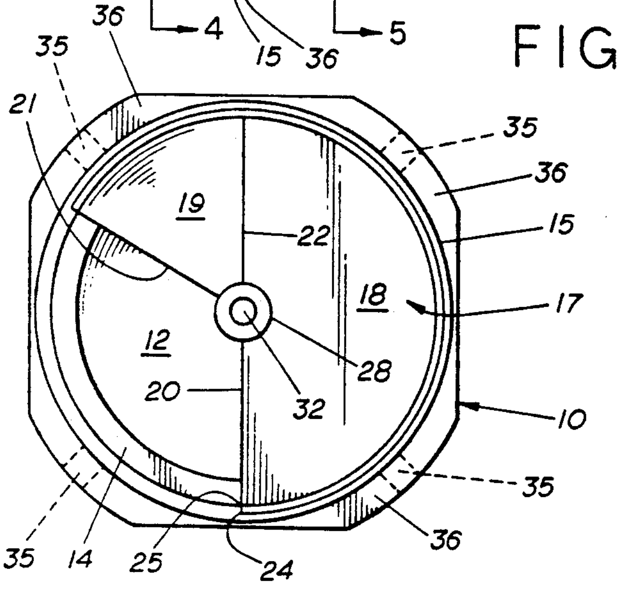
FIG. 4. is a top view of the circular walled container showing a top view of the dispenser member positioned in the circular walled container and the top off the circular walled container.

In the case of a mechanical means for rotation of the apparatus 10, at least in some embodiments, as can best be seen in FIG. 3 a domed floor 29 may be provided to prevent the lodging of single homogeneous units 11 on the bottom 12. In some applications of apparatus 10 where it is tilted the discharge all of the single homogeneous units 11 in the apparatus 10 would be prevented without the domed floor 29. The domed floor 29 therefore causes the single homogeneous units 11 to be turned over on the generally circular wall 13 upon rotation of the apparatus 10 of this invention. By turning over the single homogeneous units 11 onto the generally circular wall 13 the single homogeneous units 11 are forced to be engaged by the helical member 14 for dispensing. This ability to get the last single homogeneous unit 11 out of the apparatus 10 is very important when the single homogeneous units 11 are narcotics or very expensive and one must account for each and every single homogeneous unit 11. Also, it is important, when as shown in FIG. 1 the apparatus 10 is bar coded 48 with the type and quantity of single homogeneous units 11, to know that all of the quantity shown on the bar code can be dispensed so that none is left behind. This is especially true when the apparatus 10 is used in automated systems.

Figure 10:
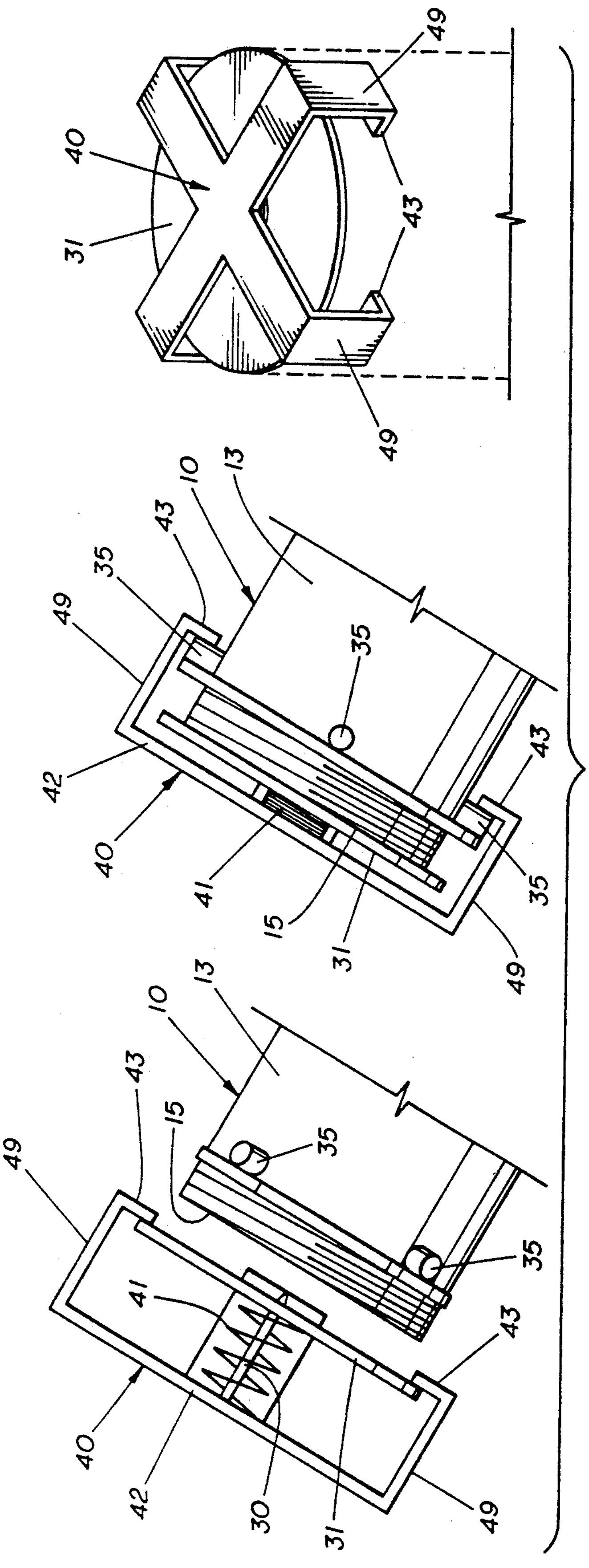
FIG. 10 is a sectional view of fast caps showing their use with circular walled container of this invention.

Also in some embodiments as shown in FIG. 2 cap 16 may be removed and the apparatus 10 of this invention may be stored with a fast release cap 40 installed as shown in FIG. 10. In some embodiments the fast release caps 40 have a flat cap 31 slidably center mounted through a guide stake 30 for sliding thereon. In one embodiment the guide stake 30 aids in centering flat cap 31 for fully covering the apparatus 10 when the flat cap 31 is in place on the apparatus 10. In at least one embodiment where the apparatus 10 is provided with a center post 28 which has a female receiving member 32 the guide spike 30 is positioned into receiving female member 32 for providing guidance to the center and completely covering the top 15 of the apparatus 10 with flat cap 31.

The center post 28 where the female receiving member 32 is located has a beveled surface 33 which acts as a guideway to guide the guide spike 30 into the female receiving member 32 as the apparatus 10 of this invention is positioned against the flat cap 31. Thus it will be understood by those skilled in the art that the apparatus 10 of this invention could have its cap 16 be a shipping cap and it may be removed and the apparatus 10 of this invention would then use fast caps 40 having flat caps 31 with guide spikes 30 projecting therefrom for guiding and receiving the apparatus 10 for sealing engagement with flat cap 31. It will be appreciated by those skilled in the art that any conventional flat cap 31 could be driven by a spring 41 for engagement of the flat cap against the top 15 of the apparatus 10 and also against the exterior cover 42 of fast release cap 40 to provide a tight seal. To allow the apparatus 10 to be covered by the fast release cap 40 at least in the embodiment as shown in FIG. 7, the generally circular walls of apparatus 10 are provided with pins 34 and as shown in FIG. 1 and 2 and functional pins 35. These functional pins 35 are connected to a ridged surface 36 which is attached to exterior wall of the generally circular wall 13 of the apparatus 10.

It can be seen in FIG. 1, 2 and 3 that the functional pins 35 and ridged surface 36, as well as the pins 34 extend out beyond the generally circular walls 13 of the apparatus 10. The fast release cap 40 is provided with projecting members 49 which have lips 43 on the distal portion of projecting member 49. Thus it can be seen that in one position of the apparatus 10 to the fast release cap 40 the functional pins 35 and ridged surface 36 and/or pins 34 will clear the projecting members 49 and lips 43 but upon rotation of either the fast release cap 40 or the apparatus 10 that the functional pins 35 and ridged surface 36 and/or pins 34 will be engaged for securing the fast release cap 40. As already discussed the spring 41 drives against flat cap 31 and the top 15, thus when the functional pins 35 and ridged surface 36 and/or pins 34 are engaged with the lips 43, the fast release cap 40 is secured and the apparatus 10 is firmly closed.

In mechanical dispensing, sometimes an adjustment in the tilt angle of apparatus 10 is needed to either enhance or degrade the effectiveness of its dispensing. For example, when the apparatus 10 is very full of single homogeneous units 11, the single homogeneous units 11 are more easily dispensed so the apparatus 10 may be tilted upward from the horizontal to more easily dispense only one single homogeneous unit 11 at a time. However, when the apparatus 10 is almost empty, it becomes more difficult to dispense the single homogeneous units 11 and the tilt angle may be adjusted downward. It has been found that tilt angles between 3 degrees and 60 degrees upward from horizontal have been effective for most single homogeneous units 11 to be dispensed.

The apparatus 10 of at least one embodiment has been provided with a bottom receiving female member 37 for receiving a male member not shown, for providing both the ability to adjust tilt angle and also allow the apparatus 10 to be rotated thereabout. The entrance to the receiving female member 37 is provided with a beveled entry surface 38 for guiding a male member into the bottom receiving female member 37. Further, in at least one embodiment in addition to providing the bottom receiving female member 37 there are provided bottom pins 39 which extend from the lower portion of the exterior wall of the apparatus 10 and which may be made available for engagement by a mechanical means not shown for holding the apparatus 10 for making tilt angle adjustment and for rotation of the apparatus 10.

It will be appreciated by those skilled in the art that in the hand held version the human eye and hand can adjust for various tilt angles for achieving a more efficient dispensing of the single homogeneous units 11 from the apparatus 10, but in the case of mechanical dispensing, the helical angle of the helical member 14, tilt angle and depth of the helical member 14 become significantly more critical and may be adjusted to obtain optimum results.

Figure 5:
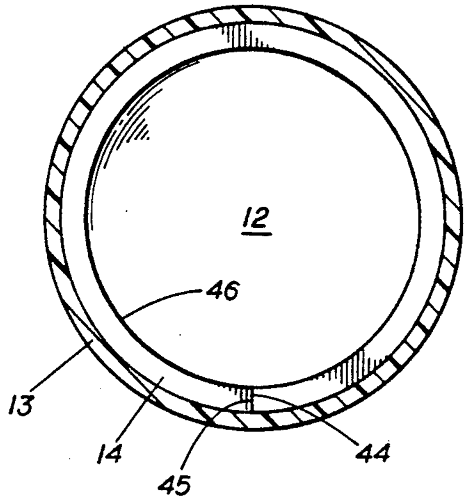
FIG. 5 is a top view of the circular walled container showing a top view of the helical member positioned in the circular walled container and the top off the circular walled container and the discharge member out of view.
Figure 6:
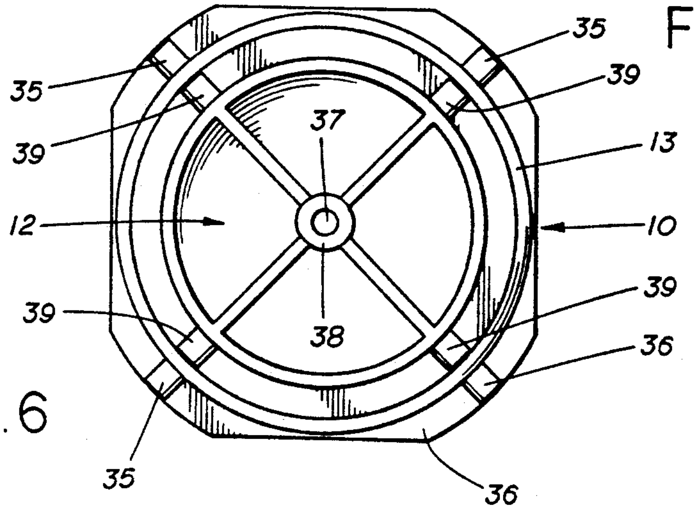
FIG. 6 is a bottom view of one embodiment of the circular walled container of this invention.

The helical angle or the number of rotational degrees that the helical member 14 would be passed through from the bottom 12 along the generally circular walls 13 of apparatus 10 will vary the effectiveness of the dispensing. For example, if the helical angle is less than 90 degrees then the helical angle is too small to create an effective variable inclined surface along the helical member 14 and the generally circular walls 13 for advancing single homogeneous units 11 along. On the other hand, to create a helical angle in excess of 720 degrees creates too great a helical angle and tumbling of the single homogeneous units 11 can occur along with the negative effects of an auger, i.e.—grinding and abrasive effects on the single homogeneous units 11. Referring to FIG. 5 a preferred embodiment of the helical angle is shown, whose helical angle is 360 degrees. Thus, to further explain and make clear how the helical angle is calculated, the helical member 14 has a starting point 44 on the bottom 15 and it passes through the generally circular walls 33 of the apparatus 10 to an end point 45, the rotational degrees, thus, as shown in FIG. 5, are 360 degrees which occur over the length of the generally circular walls 13 of the apparatus 10.

As earlier disclosed, the helix depth of the helical member 17 is also important because the goal is for one and only one single homogeneous unit 11 in a line of single homogeneous unit 11 along the helix member to be advancing along the generally circular walls 13 until a single homogeneous unit 11 is discharged. By way of further explanation, using FIG. 1, the helix depth is measured from the edge of surface 46 to the generally circular walls 11 of the apparatus 10. Thus it will be appreciated that a helix depth which is too shallow relative to the single homogeneous units 11 will allow the single homogeneous units 11 to slip over the edge and not advance the single homogeneous units 11 at all. On the other hand, a helical angle which too deep relative to the size of the single homogeneous units 11 will allow the single homogeneous units 1 to stack up on top of each other and not advance only one single homogeneous unit 11 in a line of single homogeneous units 11 along the helix member 14. By way of example for those skilled in the art, using single homogeneous units 11, such as pills, capsules, caplets and other medications it has been determined that because of their irregular shapes the critical measurements of the medications is their smallest diameter. By way of further example, a capsule is oblong and the smallest diameter for a capsule is across its width and not its length. It has thus also been discovered that a helical depth of at least ⅓ of the smallest diameter of the single homogeneous units 11 or medications and a maximum depth of 1¼ of the smallest diameter of the single homogeneous units 11 or medications to be dispensed creates a helix member 14 having a proper helical depth for advancing only one single homogeneous unit 11 or medication in a line one at a time. This helical depth also works on different shapes of single homogeneous units 11 as long as their smallest diameters are similar and they are in the relative ranges disclosed for the helical depth.

Figure 11:
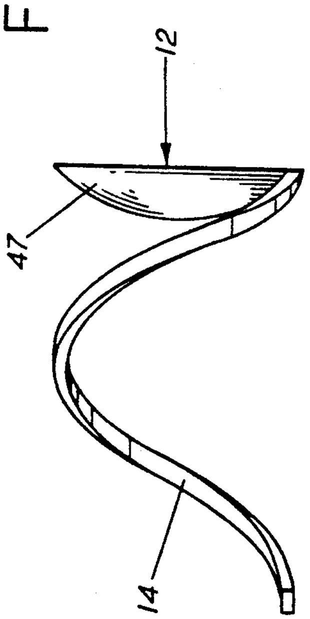
FIG. 11 is a side view of a helical member connected to a false bottom for insertion into a circular walled container.
Figure 12:
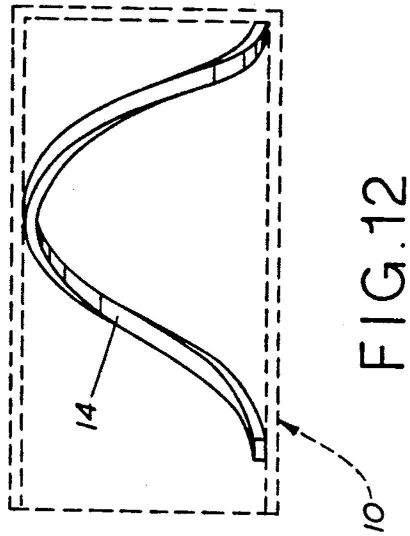
FIG. 12 is a view of a helical member made as a single element for insertion into a existing container for the formation of this invention.

While the helical member 14 may be manufactured into a container to form the apparatus 10 of this invention, other generally circular walled container may have used with the helical members. For example, a helical member 14 connected to a false bottom 47 for the addition to a circular walled container may achieve a similar result as those manufactured with helical member 14 and this would not depart from the teaching of this invention. For example, FIG. 11 shows a helical member 14 connected to false bottom 47 for insertion into a generally circular walled container. It should also be appreciated as shown in FIG. 12, that a helical member 14 could be fabricated as an independent piece and simply inserted into an existing circular walled container to achieve the function of this invention. Such an independent piece, would probably be plastic and rely upon the spring of the plastic once placed in the bottle to achieve a squeeze fit within the bottle or circular walled container.

The invention disclosed herein and its features and advantages will be understood from the foregoing description and it will be apparent that various changes and modifications may be made in the form, construction, and arrangement of the parts of this invention without departing from the spirit and scope thereof or severing its material advantages, the arrangement herein before described being merely by way of example and we do not wish to be restricted to the specific form or uses mentioned except as defined in the accompanying claims.

We claim:

1. An apparatus for dispensing single homogeneous units upon rotation of said apparatus comprising;

a generally circular walled container, a bottom in said generally circular walled container for holding said homogeneous units, a discharge means located distally from said bottom for receiving homogeneous units and for discharging same, and a helical member functionally proximate said discharge means and located on said generally circular walled container extending from said bottom of said container and along said generally circular walls of said container for creating during rotation a continuously variable inclined surface along said helical member and said generally circular walls of said container for advancing single homogeneous units along said helical member and said generally circular walls until a single homogeneous unit reaches said discharge means.

2. An apparatus for dispensing single homogeneous units upon rotation of said apparatus as in claim 1 wherein said helical member further comprises a spiral ribbed member having an edge surface and a helix depth sufficient relative from said generally circular wall of said container and said edge surface for advancing single homogeneous units along said helical member and said generally circular walls of said container until a single homogeneous unit reaches said discharge means.

3. An apparatus for dispensing single homogeneous units upon rotation of said apparatus as in claim 2 wherein said spiral ribbed member further comprises a spiral ribbed member having a helix angle sufficient relative to the length of said generally circular walled container from said bottom of said container to said discharge means for creating during rotation a continuously variable inclined plane with said circular walled container and said spiral ribbed member for advancing single homogeneous units along said helical member and said generally circular wall of said container until a single homogeneous unit reaches said discharge means.

4. An apparatus for dispensing single homogeneous units upon rotation of said apparatus as in claim 3 wherein said helix angle of said spiral ribbed member comprises a minimum of 90 degrees to a maximum of 720 degrees over the length of said generally circular walled container from said bottom of s id container to said discharge means.

5. An apparatus for dispensing single homogeneous units upon rotation of said apparatus as in claim 4 wherein said spiral ribbed member further comprises having a minimum helix depth of at least ⅓ of the smallest diameter of said single homogeneous units to be dispensed and a maximum depth of at least 1¼ of the smallest diameter of said single homogeneous unit to be dispensed for advancing single homogeneous units along said helical member and said generally circular wall of said container until a single homogeneous unit reaches said discharge means.

6. An apparatus for dispensing single homogeneous units upon rotation of said apparatus as in claim 5 wherein said bottom in said generally circular walled container comprises a raised area sufficient for directing said single homogeneous units toward said generally circular walled container and said spiral ribbed member for preventing single homogeneous units from remaining on said bottom.

7. An apparatus for dispensing single homogeneous units upon rotation of said apparatus as in claim 6 wherein said raised area further comprises a dome shape having an apex at the center of said bottom and said bottom slops downward from said raised area toward said generally circular walled container.

8. An apparatus for dispensing single homogeneous units upon rotation of said apparatus as in claim 7 wherein said discharge means further comprises a holding area for receiving and holding said single homogeneous units connected for sliding communication of said single homogeneous units from said spiral ribbed member to said holding area and a means for discharging said single homogeneous units connected for sliding communication of said single homogeneous units from said holding area to said means for discharging said single homogeneous units.

9. An apparatus for dispensing single homogeneous units upon rotation of said apparatus as in claim 8 wherein said holding area further comprises a non-helical surface connected to said ribbed spiral member having no-helical angle for at least a distance on said non-helical surface the size of said homogeneous unit and positioned for receiving said a single homogeneous unit and holding same during rotation.

10. An apparatus for dispensing single homogeneous units upon rotation of said apparatus as in claim 9 wherein said means for discharging said single homogeneous unit further comprises an inclined surface connected for sliding communication of said single homogeneous unit from said non-helical surface to said inclined surface for discharge of said single homogeneous unit by said inclined surface upon continued rotation.

11. An apparatus for dispensing single homogeneous units upon rotation of said apparatus as in claim 10 wherein said inclined surface of said means for discharging said single homogeneous units and said non-helical surface of said holding area further comprise a partial cover for said generally circular walled container for preventing said other single homogeneous units than a single homogeneous unit from being inadvertently discharged during rotation of said generally circular walled container.

12. An apparatus for dispensing single homogeneous units upon rotation of said apparatus as in claim 11 further comprising a cap means for removable closing said circular walled container from ambient environment.

13. An apparatus for dispensing single homogeneous units upon rotation of said apparatus as in claim 1 further comprising a means for removable fastening said helical member into said container having generally circular walls and a false bottom means raised to form an apex at the center of said bottom and said bottom slops downward from said raised area toward said generally circular walled container and said false bottom means is connected to said means for removable fastening said helical member into said container.

14. An apparatus for dispensing single homogeneous units upon rotation of said apparatus as in claim 13 wherein said helical member and said false bottom means are connected to said bottom as a unitized piece for insertion into said generally circular walled container and for location along said walls of said circular walled container extending from said bottom of said container and along said walls for creating a continuously variable inclined surface along said helical member and said generally circular walls of said container for moving a single homogeneous unit along said helical member and said circular walls until said single homogeneous unit is discharged upon said continued rotation of said container.

15. An apparatus for dispensing single homogeneous units upon rotation of said apparatus as in claim 11 further comprising a means located in said bottom and outside of said generally circular walled container for allowing the positioning and securing of said generally circular walled container for rotation of said generally circular walled container.

16. An apparatus for dispensing single homogeneous units upon rotation of said apparatus as in claim 15 wherein said means for positioning and securing said generally circular walled container for rotation further comprises a female member located in the center of said bottom and inside said raised area of said bottom for mounting said generally circular walled container for rotation there about and for tilt angle adjustment.

17. An apparatus for dispensing single homogeneous units upon rotation of said apparatus as in claim 16 wherein said female member further comprises a beveled entrance way for ease of mounting said generally circular walled container for rotation thereabout.

18. An apparatus for dispensing single homogeneous units upon rotation of said apparatus as in claim 17 further comprising means on said outside of said circular walled container for allowing mechanical holding of said circular walled container for rotation and tilt angle adjustment sufficient for discharging only one single homogeneous unit at a time.

19. An apparatus for dispensing single homogeneous units upon rotation of said apparatus as in claim 18 further comprising at least two pins connected to said circular walled container and projecting outwardly therefrom proximate said bottom for being grasped to hold said circular walled container for rotation and for tilt angle adjustment sufficient for discharging only one single homogeneous unit at a time.

20. An apparatus for dispensing single homogeneous units upon rotation of said apparatus as in claim 19 wherein said circular walled container is rotated in a tilted angle sufficiently upward from horizontal and less than vertical for varying the variable inclined surface along said helical member and said generally circular walls of said container for advancing single homogeneous units along said helical member and said circular walls until said medications are discharged one at a time upon said continued rotation of said container.

21. An apparatus for dispensing single homogeneous units upon rotation of said apparatus as in claim 20 wherein said tilted angle for discharging only one single homogeneous unit at a time from said circular walled container is a minimum upward inclined angle of from 3 degrees to a maximum incline angle of 60 degrees from said circular walled container being substantially horizontal.

22. An apparatus for dispensing single homogeneous units upon rotation of said apparatus as in claim 7 wherein said discharge means further comprises a female member located in the center thereof and inside said discharge means for allowing rotation of said apparatus for closure and storage.

23. An apparatus for dispensing single homogeneous units upon rotation of said apparatus as in claim 22 wherein said female member further comprises a beveled entrance way for ease of mounting said generally circular walled container for rotation and for storage.

24. An apparatus for dispensing single homogeneous units upon rotation of said apparatus as in claim 23 further comprising at least two pins connected to said circular walled container and projecting outwardly therefrom proximate said discharge means for rotation into engaging storage of said apparatus.

25. An apparatus for dispensing single homogeneous units upon rotation of said apparatus as in claim 12 wherein said cap further comprises, a cap housing, a centering spike in the center of said cap for guiding said cap for positive closure of said generally circular walled container, a flat cap slidably center mounted through said centering spike for closing said generally circular walled container, a spring means mounted about said centering spike and between said cap housing and said flat cap for driving said flat cap away from said cap housing, and at least two means projecting from said cap housing which clear said generally circular walled container but engage said at least two pins connected to said circular walled container upon rotation of said container and said spring means drive said flat cap on said container into said at least two projecting means to close said generally circular walled container.

26. An apparatus for dispensing single homogeneous units upon rotation of said apparatus as in claim 9 wherein said non-helical surface connected to said ribbed spiral member is at right angles with the axis of said generally circular walled container.

27. An apparatus for dispensing single homogeneous units upon rotation of said apparatus as in claim 26 wherein said non-helical surface connected to said ribbed spiral member is provided with enhanced contrast from said homogeneous units for improved sensing of the presence of said single homogeneous unit on said non-helical surface.

28. An apparatus for dispensing single homogeneous units upon rotation of said apparatus as in claim 26 wherein said non-helical surface connected to said ribbed spiral member is coated for improved sensing of the presence of said single homogeneous unit on said non-helical surface.

29. An apparatus for dispensing single homogeneous units upon rotation of said apparatus comprising;

a generally circular walled container, a bottom in said generally circular walled container for holding said single homogeneous units and, a helix ribbed member located on said generally circular walled container having an edge surface and helix depth sufficient relative from said generally circular wall of said container and said edge surface, and having a helix angle sufficient relative to the length of said generally circular walled container from said bottom of said container for creating during rotation a continuously variable inclined surface along said helix ribbed member and said generally circular walls of said container for advancing single homogeneous units along said helical ribbed member and said generally circular walls of said container until a single homogeneous unit is discharged from said generally circular walled container.

30. An apparatus for dispensing single homogeneous units upon insertion into a generally circular walled bottle and upon rotation of said generally circular walled bottle comprising;

a helix ribbed member removably located on said generally circular walled container having an edge surface and a helix depth sufficient relative from said generally circular wall of said container and said edge surface after insertion in said generally circular walled container, and having a helix angle sufficient relative to the length of said generally circular walled container from said bottom of said container for creating during rotation a continuously variable inclined surface along said helical member and said generally circular walls of said container for advancing single homogeneous units along said helical member and the generally circular walls of the container until a single homogeneous unit is discharged from said generally circular walled container.

* * * * *